(12) United States Patent
Howard

(10) Patent No.: US 6,267,395 B1
(45) Date of Patent: Jul. 31, 2001

(54) VEHICLE STEERING COMPENSATOR WITH AIR ACTUATED TRIM MECHANISM

(76) Inventor: Durrell U. Howard, 306 Krameria Dr., San Antonio, TX (US) 78213

(*) Notice: Subject to any disclaimer, the term of this patent is extended or adjusted under 35 U.S.C. 154(b) by 0 days.

(21) Appl. No.: 09/419,636

(22) Filed: Oct. 18, 1999

(51) Int. Cl.$^7$ .................................................. B62D 7/22

(52) U.S. Cl. ........................... 280/89.11; 280/89.13; 280/90

(58) Field of Search ....................... 280/89.11, 89.12, 280/89.13, 90

(56) References Cited

U.S. PATENT DOCUMENTS

| | | |
|---|---|---|
| 1,777,109 | * 9/1930 | Stokes et al. ............. 280/90 |
| 1,951,483 | * 3/1934 | Knapp et al. ............. 280/90 |
| 2,509,570 | 5/1950 | Lee . |
| 2,760,518 | 8/1956 | Peet . |
| 3,075,576 | 1/1963 | Herbert . |
| 3,169,551 | 2/1965 | Lewis . |
| 3,230,975 | 1/1966 | Mercier . |
| 3,318,251 | 5/1967 | Smith . |
| 3,730,307 | 5/1973 | Mitchell . |
| 3,756,367 | 9/1973 | Mitchell et al. . |
| 3,792,721 | 2/1974 | Zahid . |
| 3,857,413 | 12/1974 | Zahid . |
| 3,863,947 | 2/1975 | Weston . |
| 3,870,335 | 3/1975 | Schulz . |
| 3,882,953 | 5/1975 | Maisch . |
| 3,882,954 | 5/1975 | Inoue . |
| 3,887,027 | 6/1975 | Allison . |
| 3,897,846 | 8/1975 | Inoue . |
| 3,958,656 | 3/1976 | Niemann . |
| 3,960,179 | 6/1976 | Zahid . |
| 3,961,646 | 6/1976 | Schön . |
| 4,088,154 | 5/1978 | Patton et al. . |
| 4,349,079 | 9/1982 | Lieber . |
| 4,359,123 | 11/1982 | Haupt et al. . |
| 4,410,193 | 10/1983 | Howard . |
| 4,418,931 | 12/1983 | Howard . |
| 4,467,884 | 8/1984 | Robertson et al. . |
| 4,503,678 | 3/1985 | Wimbush . |
| 4,506,507 | 3/1985 | Wimbush . |
| 4,534,577 | 8/1985 | Howard . |
| 4,566,712 | 1/1986 | Motrenec . |
| 4,585,400 | 4/1986 | Miller . |
| 4,588,198 | 5/1986 | Kanazawa et al. . |

(List continued on next page.)

FOREIGN PATENT DOCUMENTS

| | | |
|---|---|---|
| 1 901 588 | 8/1970 | (DE) . |
| 43 18 556-C1 | * 12/1994 | (DE) . |
| 198 03 745-A1 | * 8/1999 | (DE) . |
| 198 51 678-A1 | * 5/2000 | (DE) . |

Primary Examiner—Lanna Mai
Assistant Examiner—Ruth Ilan
(74) Attorney, Agent, or Firm—Connolly Bove Lodge & Hutz LLP

(57) ABSTRACT

A vehicle steering compensator for resisting off-center movement of the steered wheels of a vehicle and returning them to a selected center position after each such off-center movement. The compensator includes a centering unit for providing resisting and returning forces, and a trimming unit for varying the center position. The resistance unit includes a linkage extending between the steering system and a fixed vehicle member and the trimming unit has a trim piston movable relative to a trim cylinder to vary the center position by changing the length of the linkage. Dual trim valves are opened in response to extension of an air piston so that liquid flows between trim chambers on opposite side of the trim piston while the trim piston moves to a new center position. Closure of the trim valves in response to retraction of the air piston then locks the trim piston in its new center position. The resisting and returning forces may also be varied remotely, and may have the same or different values.

15 Claims, 5 Drawing Sheets

U.S. PATENT DOCUMENTS

| | | |
|---|---|---|
| 4,634,135 | 1/1987 | Nakata et al. . |
| 4,638,838 | 1/1987 | Richard et al. . |
| 4,722,545 | 2/1988 | Gretz et al. . |
| 4,828,063 | 5/1989 | Ogura et al. . |
| 4,872,486 | 10/1989 | Sugimura et al. . |
| 4,903,973 | 2/1990 | Bray . |
| 5,527,053 | 6/1996 | Howard . |
| 5,536,028 | 7/1996 | Howard . |
| 5,620,194 * | 4/1997 | Keeler et al. .......................... 280/90 |
| 5,816,594 | 10/1998 | Howard . |
| 6,003,887 * | 12/1999 | Howard ............................ 280/89.11 |

* cited by examiner

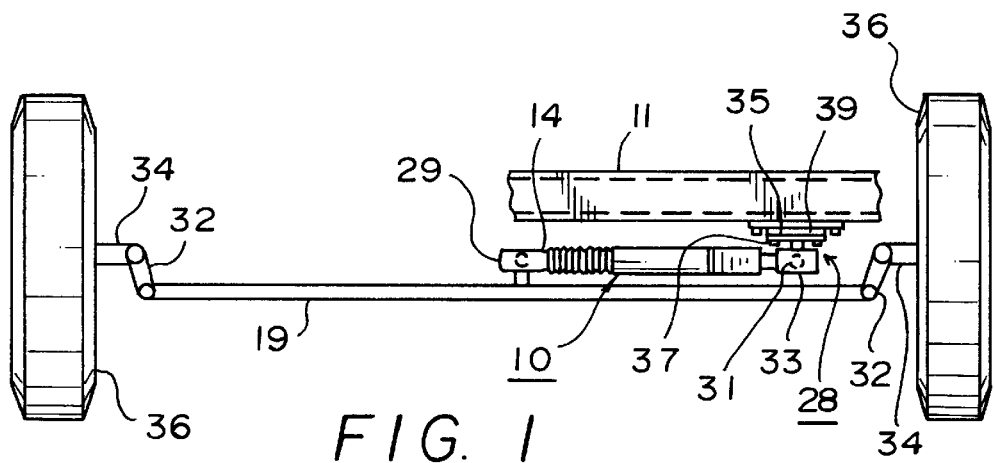
FIG. 1
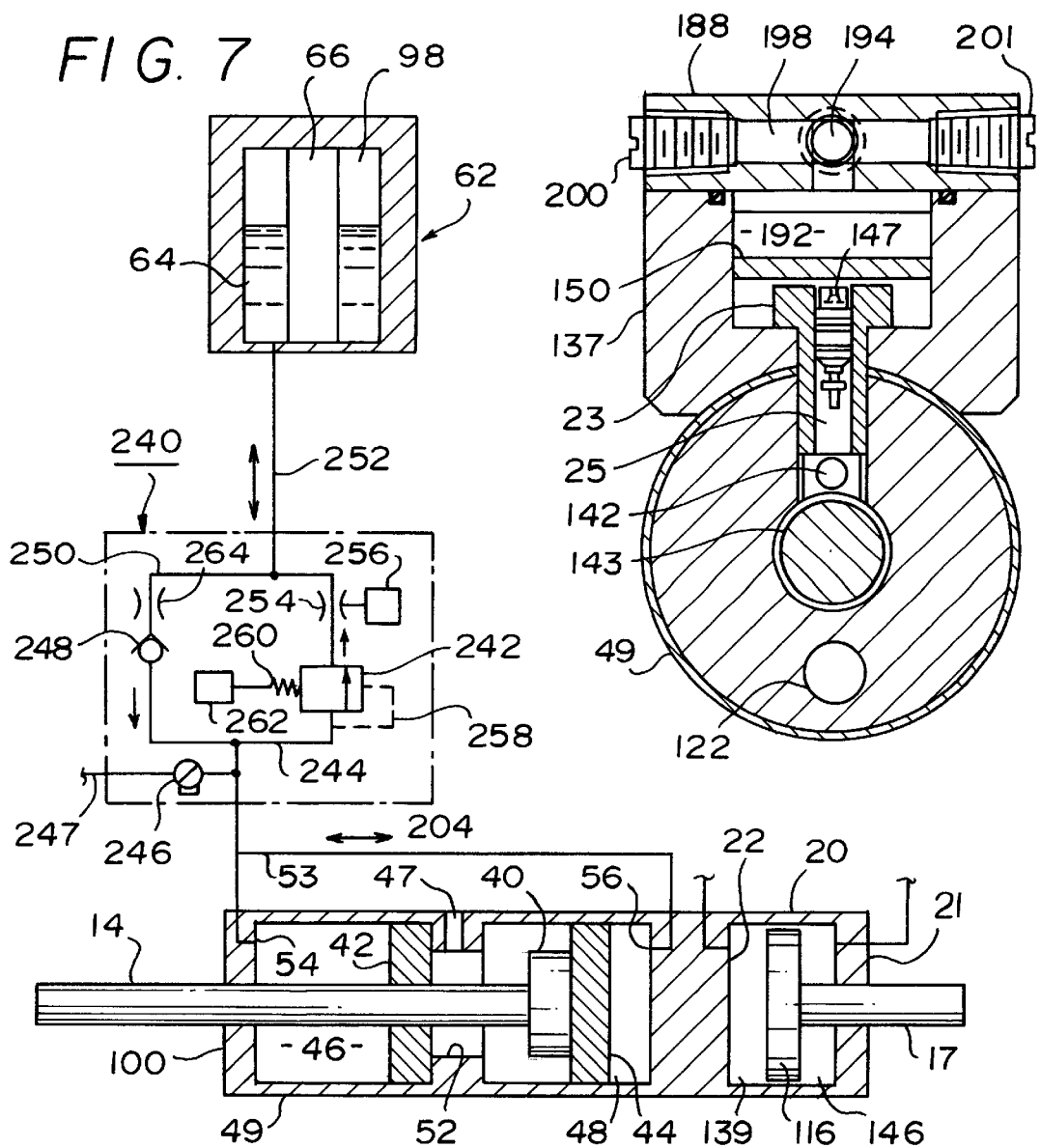
FIG. 6
FIG. 7

VEHICLE STEERING COMPENSATOR WITH AIR ACTUATED TRIM MECHANISM

FIELD OF THE INVENTION

This invention relates to vehicle steering systems and more particularly to a centering device for controlling the steerable wheels of a vehicle such as a motor home, bus, truck, automobile or the like so that a center steering position is selected and maintained in spite of spurious influences on the steerable wheels, such as those caused by variable crosswinds, crowned or slanted roadways, or other factors tending to adversely affect vehicle steering by the driver.

BACKGROUND OF THE INVENTION

The steering systems of highway vehicles and the like are designed primarily for driver control. In these systems, the steering force required on the steering wheel and the ratio between steering wheel movement and movement of the steerable ground wheels depend upon the characteristics of the particular vehicle and the conditions under which it will usually be operated. A wide variety of extraneous forces can act on a vehicle steering system and spurious steering inputs caused by these forces must be dealt with satisfactorily in order to provide stable and controllable steering of a vehicle. As vehicle speed increases, the effects of any spurious steering inputs are magnified, making it necessary for the driver to exercise more precise and careful driving control.

The transmission of these spurious inputs between the steerable wheels and the steering wheel causes the interconnecting components of the steering system to repeatedly oscillate between states of tension and compression. Such oscillations cause wear and slack in ball joints and other connections and have long been considered a primary source of stress fatigue which can lead to premature failure of various steering system components. Mechanical slack due to worn parts can also be a cause of steering system oscillations and vehicle wandering that require constant corrections and therefore contribute to driver fatigue.

The ideal driving situation is therefore one where the steering system inherently causes the vehicle to travel in an unswerving straight line unless the driver intentionally turns the vehicle in another direction. Thus, the ideal steering system would require relatively little attention from the driver as the vehicle progresses along a straight line path down the roadway. From a steering standpoint, the vehicle should not respond to anything but the driver's steering commands and these must be of sufficient magnitude to overcome a significant resistance to turning away from center. In the absence of a steering input by the driver, the vehicle should literally do nothing but progress straight ahead.

Vehicles with steering systems having positive caster generally track relatively straight ahead and resist steering inputs away from center, including those of the driver, provided that the roadway they are travelling on is smooth and is not slanted or crowned. Such positive caster is provided by positive caster offset, which is also known as mechanical trail. Caster offset is the distance from the ground intersection point of a pivot line drawn through the pivot axis of a steerable wheel to a contact point at the center of the area over which the wheel contacts the ground. The pivot axis of a steerable wheel of a motor vehicle is usually provided by a "king pin". Because the contact point of a steerable wheel with positive caster trails the pivot line point of the wheel, side forces cause the wheel to turn in the direction that the force is being applied. A good example of this is the way in which the castered wheels on the front of a shopping cart are easily turned in the direction of applied force.

The adverse effects described below are some of the negative aspects of achieving steering stability with positive caster offset. Because of the side force applied by gravitational pull on a slanted or crowned highway, positive caster offset causes a motor vehicle to freely turn to the low side, creating a steering wheel pull that requires counteractive steering input from the driver to keep the vehicle from leaving the highway. The amount of driving fatigue that is directly caused by positive caster offset under these conditions may be appreciated by considering the many millions of miles driven by truck drivers and other motorists each day on crowned or slanted highways.

Another fatiguing driving condition that may be encountered by a motorist is that of controlling a crosswind steering input. The amount of adverse steering input caused by crosswinds is directly related to the amount of positive caster offset, which is a classic example of having to balance a benefit with a detriment. The small amount of stability gained from castering the steerable wheels on a non-windy day may be paid for many times over when driving in a crosswind because of the destabilizing effect of the crosswind when combined with positive caster offset. Positive caster offset also allows steering inputs from rutted and other imperfect roadway surfaces to steer back against the driver and thereby cause road wander, which is a universal driving complaint, particularly by driver's of heavy vehicles such as trucks and motor homes.

For the lack of a more advanced method, steerable wheel castering has been accepted by the industry as a low-cost method of achieving steerable wheel returnability. Thus, large, heavy over-the-road vehicles are presently provided with generous amounts of positive caster. Not much thought has been given to the self-defeating side effects of steerable wheel castering. Instead, the lack of directional stability is blamed on the size and weight of the vehicle.

As the size and weight of over-the-road vehicles increases, the need for directional stability becomes more important. Learning to drive a heavy vehicle means learning to control the back steer caused by the adverse side effects of steerable wheel castering. The failure of the industry to recognize the critical need to provide directional stability by replacing steerable wheel castering with another method of achieving steerable wheel returnability may go down in history as one of the longest enduring heavy vehicle design oversights.

The lack of directional stability is fundamentally the reason that heavy vehicle driving is much more stressful than it otherwise needs to be. Keeping a heavy vehicle, that is lacking in directional stability, tracking straight and under control for extended periods of time is a major cause of driving fatigue and related accident potential. The failure of numerous driver fatigue and alertness studies to consider the contribution made by "driving" fatigue in the overall evaluation is indicative of the wide-spread failure of the industry to recognize the lack of directional stability as the major cause of driver fatigue resulting from driving fatigue. Accordingly, a dramatic reduction in driver fatigue may be made by making heavy over-the-road vehicles directionally stable and thereby significantly reducing driving fatigue.

The term "directional stability" does not legitimately apply to the current production of heavy vehicles because they are, in fact, not directionally stable. The lack of heavy vehicle directional stability is not the fault of the steering gear. The purpose of past improvements in the art of steering gears and other steering components has been to make it easier for the driver to control the unstable behavior of castered steerable wheels. Irrespective of such refinements in the steering gear and related components, when the steerable wheels are allowed to caster, the driver will still have to make the same excessive number of steering corrections to control road wander, slanted road steering wheel pull, and down wind steerable wheel castering.

Thus, a highly important consideration that has long been overlooked by the industry is that steerable wheel castering is directly responsible for road wander, crowned road steering wheel pull and cross wind steering problems. Keeping an unstable heavy vehicle tracking straight and under control currently requires an inordinate amount of driver steering corrections to counteract the adverse side effects of castered wheels. The repetitive task of making thousands of precise steering corrections mile after mile weighs heavily on a driver's physical and mental well-being, and may result in extreme driving fatigue. Thus, vehicle directional stability especially for heavy vehicles can only be achieved by stabilizing the on-center behavior of the steerable wheels with a more suitable method than the traditional steerable wheel castering used on all current production vehicles.

SUMMARY OF THE INVENTION

It is believed that directional stability of motor vehicles, particularly heavy vehicles, can only be achieved by stabilizing the return-to-center and on-center behavior of the steerable wheels with a more suitable method than the traditional steerable wheel castering used on all current production vehicles. When the steerable wheels are stabilized, there is a considerable reduction in the amount of corrective steering required by the vehicle driver, resulting in a major reduction in driving fatigue. Therefore, the purpose of the present invention is to provide on-center and return-to-center improvements in steering systems for over-the-road vehicles by adding a steerable wheel centering feature to prior art steering systems.

The primary function of present state of the art power steering systems is to assist the driver when turning away from center. When the driver releases the steering wheel after turning, a rotary valve in the steering gear is returned to neutral by a torsion rod arrangement. When this rotary valve is in its neutral position, the power steering gear has no influence on the direction of the steerable wheels. This arrangement or operating mode is called "free return" and allows the influence of the road surface and the steering geometry to cause the steerable wheels to return to a center position. In the center position, conventional steering units do not control the steerable wheels except in response to corrective steering inputs transmitted from the driver through the steering shaft.

The present invention provides a steering compensator for returning turned steerable wheels to a remotely adjustable on-center position, and for keeping the steerable wheels tracking straight ahead in the on-center position, such that they will respond only to intentional steering inputs by the vehicle driver.

The invention thus provides improved on-center control of the steerable wheels, and significantly reduces driver fatigue because it results in a major reduction in the steering inputs required of the driver. This is accomplished by allowing the driver to easily make small adjustments in the center position of the steering system to fine tune steering of the vehicle during its operation. Such fine tuning is made while driving, and makes driving more pleasurable and less fatiguing.

The invention thus comprises a power centering compensator having a center position which is remotely adjustable to permit the driver of the vehicle to change and reset the center position of the steering system to compensate for new or changed steering forces which would otherwise cause the vehicle to deviate from its straight ahead course.

In addition, the power centering compensator of the invention provides remotely adjustable levels of resistance force for opposing off-center steering movements and of centering force for returning the steering system to its center position after a turning movement. The adjustment means also provides for different levels of steering force to initiate or breakaway into a steering movement away from center. This level of force is sometimes referred to in this specification as the "break away resistance". Different levels of break away resistance and of resistance force may be appropriate to compensate for different steering system characteristics on the same or different types of vehicles and/or for changes in the forces acting upon the vehicle. The level of break away resistance and of resistance force opposing movement away from center may be remotely adjusted either by a control mechanism operable by the driver or by a speed control mechanism responsive to the speed of the vehicle.

The power centering force for returning the steering system to center may also be remotely adjusted either by a control mechanism operable by the driver or by a speed control mechanism responsive to the speed of the vehicle. In the present invention, the level of this return force may be the same as or may differ from the resistance force level. Both the resistance force and the return force provided by the compensator are increased or decreased to provide a level of force sufficient to overcome any spurious steering inputs and to suit driver road feel, particularly a feel of the steering wheel that lets the driver know when the steered wheels are beginning to move away from center and are closely approaching return to center.

The invention also provides a distinctive feel when approaching or leaving the center position. Thus, the sense of touch is added to the visual sense to aid control of the vehicle and reduce driver fatigue. The turning resistance selected should satisfy the road feel desired by the driver and be sufficient to overcome anticipated spurious inputs.

The power centering compensator may be left on continuously because it will automatically turn off with the ignition and come back on when the engine is started. With any malfunction of the vehicle's power steering, an automatic disabling feature of the invention shuts the compensator completely off.

Although the present invention is particularly useful as a power centering mechanism for motor vehicles, it can be employed to position any steerable member moveable to either side of a preselected position. For example, the compensator can keep an outboard motor centered so that a boat follows a straight course over the water in the presence of spurious steering forces produced by wind and wave action. The compensator can also be used to center such steerable members as the rudders of ships or airplanes and the tongues of tandem trailers or railway cars. The compensator is useable with both power and non-powered steering systems, with the level of compensating forces provided usually being less for vehicles without power steering.

The compensator may be used with steering systems having a reduction gear between the steering wheel and the steerable wheels. In this application, the compensator is preferably connected to the steering system at a location between the steerable wheels and the reduction gear so as to be unaffected by any slack in the reduction gear or in components and connections between the reduction gear and the steering wheel. It is therefore on the slow side of the reduction gear ratio. The invention thus provides a zero backlash hydraulic centering assembly.

The compensator is preferably connected between the steering system and the front axle or a frame member of the vehicle in a position that allows the steerable member to move through its full range of steering movements while providing sufficient leverage for the apparatus to resist movement of the steerable member away from the center position producing straight ahead travel of the vehicle. The steering system connection may be made to any steering system component providing appropriate range and leverage, such as a tie rod which joins the two front steerable wheels of a highway vehicle, or the pitman arm connected to the reduction gear. The frame connection may be made to any component serving as a fixed mounting relative to the steering system. This fixed component may be a frame member, or an axle or some other part carried by the vehicle frame instead of an actual frame member.

The foregoing objects and advantages are achieved by the return-to-center and the on-center holding system of the steering compensator of the present invention. The steering compensator comprises a centering unit and an air actuated trimming unit, as well as related fluid actuating and electrical control systems. The resistance for resisting turning movements of the steerable wheels away from center is provided by a zero back lash hydraulic centering assembly that includes a piston rod that is preferably attached either to the steering gear pitman arm or directly to some other steering system linkage between the reduction gear and the steerable wheels, such as the tie rod.

The centering assembly comprises a centering cylinder containing two pistons having rest positions against a center stop that holds an enlarged head of the piston rod captive therebetween in the on-center position. When the steerable wheels are turned away from center, one or the other of the pistons is displaced by the piston rod head, depending on the direction of the vehicle turning movement being initiated. When the driver releases the steering wheel, the displaced piston returns the piston rod head and the steerable wheels to their on-center positions. A fluid pressure source maintains a substantial pressure in the cylinder chambers outboard of each piston, and this pressure causes the captured piston rod head to keep the steerable wheels on-center tracking with accuracy that is not achievable with any other methods. The pressurized fluid may be a gas, such as air, or a liquid, and is preferably a hydraulic fluid.

The hydraulic pressure source is preferably an air over hydraulic pressure accumulator that includes a reservoir for the hydraulic fluid. Air pressure from a pressurized air source, such an onboard compressor, a vehicle air brake system, or some other conventional air pressure source may be regulated by a control on the driver control panel. The accumulator has a flexible diaphragm that defines separate air and liquid chambers. By selectively varying the pressure within the air chamber, hydraulic fluid pressure and resulting forces applied to the dual pistons are varied, thereby varying the resistance to off-center movement of the steering system, as well as the return force for recentering the steering system. It is also within the scope of the present invention to use a variety of centering cylinder designs and to pressurize the centering cylinder using other liquid or gas pressurization systems, such as those described in my prior U.S. Pat. Nos. 4,410,193 and 5,536,028, the entire contents of each of these patents being incorporated herein by reference.

Another important feature of the present invention is the provision of a remotely operable trimming means for controllably varying the selected center position of the steerable wheels to be maintained by the compensator. In particular, a trim rod connected to a trim piston is reciprocally carried within a hydraulic trim cylinder integrally attached to one end of the centering cylinder. Hydraulic fluid from the fluid system accumulator is supplied to chambers on opposite sides of the trim piston and its flow between these chambers is controlled by a trim valve means having dual trim valves that are actuated between their open and closed positions by an air piston reciprocally carried within an air cylinder mounted on the hydraulic trim cylinder. A liquid trimming fluid is preferred because it is substantially incompressible as compared to a gaseous trimming fluid and therefore provides the capability of locking the trim piston in its trimmed position without appreciable slack.

The distal end of the trim rod is pivotally mounted to the vehicle frame, while the distal end of the centering rod is pivotally mounted to the steering system linkage, although these pivotal connections may be the reverse. The hydraulic fluid in the trim cylinder is trapped on opposite sides of the trim piston by the trim valves, creating a hydraulic lock that holds the centering stop of the centering cylinder in a selected on-center position. When the push button of an air valve is actuated, air supplied to the actuating piston causes both of the trim valves to open, allowing hydraulic fluid to pass from one side of the trim piston to the other. This causes the centering cylinder (and its centering stop) to move precisely by the amount necessary to coincide with the straight ahead direction that the vehicle is being steered by the driver. Releasing the trim button allows the dual trim valves to close, recreating a hydraulic lock in the trim cylinder to hold the centering assembly in the new on-center position to which it has been trimmed.

The trim piston within the trim cylinder preferably has a stroke of less than one inch, more preferably about one-half inch. The average trim corrections may be on the order of a few one thousands of an inch.

When trimming the system, the driver holds the steering wheel to establish an on-center straight ahead position of the steering system. While holding this on-center position, the trim button is held down for a few seconds, allowing relative movement between the trim cylinder and the trim piston which in turn causes the centering cylinder to move automatically to a new on-center steering position in which both centering pistons are seated against the centering stop. Trimming the system is therefore an easy and natural driving function. Should the driver sense a degree of steering wheel pull that becomes a bother, this pull is quickly eliminated by pressing the trim button.

The trim button is preferably on a driver control panel that is conveniently located near the driver to make it possible for steering corrections to be made while driving. The control panel preferably provides three basic functions, namely, a switch to turn the centering system on and off, a centering effectiveness control and pressure gauge, and the momentary trim button or some other trim switch. Should the fluid pressure be insufficient for attaining or holding the on-center position, the driver merely increases the resistance and return (centering) forces by adjusting the centering effectiveness control, which preferably is an adjustable pressure regulator for controlling air pressure in the accumulator. Activating and adjusting the centering forces are therefore also an easy and natural driving function.

The preferred embodiments of the present invention therefore include the following features: a resistance force for opposing steering movement away from center, a return force for return to center of sufficient magnitude to overcome spurious steering inputs, remotely variable levels of resistance force and return force through a predetermined range of turning movement, a remotely trimmable center position, distinctive driver road feel, no substantial overshoot, a fail-safe mode for disabling the centering assembly in the absence of power steering, precision centering, dampening of erratic steering movements, compact size, economical to manufacture and install, and utility for old and new vehicles with or without power steering.

The invention thereby provides improved on-center and away-from-center control of the steerable wheels, and significantly reduces driver fatigue resulting from driving fatigue because it results in a major reduction in driver steering inputs. The invention also eliminates the need for any positive castering by providing directional stability of the steerable wheels when there is no positive caster, i.e., a caster angle of zero degrees (0°). Thus, on-center tracking of the steerable wheels is achieved by a means that does not have the deficiencies inherent in positive caster offset, and that substantially reduces the need for corrective steering inputs from the vehicle driver. The positive on-center feel of such a directionally stable vehicle provides a new level of driveability for motor vehicles, including automobiles, trucks, buses, campers and motorized homes. The invention thus attains new levels of directional stability and driveability, which reduce driver fatigue to a level that cannot be achieved by conventional positive caster centering. The replacement of steerable wheel castering with the power centering technology of the present invention has a number of additional advantages. These include precision on-center directional stability of the steerable wheels that make the vehicle more comfortable to drive, a corresponding reduction in accident potential due to the considerable reduction in driving fatigue, improvement in steerable wheel blowout protection and related safety, improvement in the tire wear pattern of the steerable wheels that increases tire life and reduces maintenance costs, a stable non-swaying ride that improves passenger comfort, particularly in buses and other large vehicles, and lower insurance costs due to significant improvements in overall vehicle safety.

BRIEF DESCRIPTION OF THE DRAWINGS

The invention, both as to its structure and operation, may be further understood by reference to the detailed description below taken in conjunction with the accompanying drawings in which:

FIG. 1 is a plan view illustrating installation of the invention between the frame and steering system of a motor vehicle;

FIG. 6 is a cross-sectional view taken along line 6—6 in FIG. 5 and showing details of a trim valve as actuated to its open position; and FIG. 7 is a schematic diagram of a modification of the hydraulic system of the invention.

DETAILED DESCRIPTION OF THE INVENTION

Figure 2:
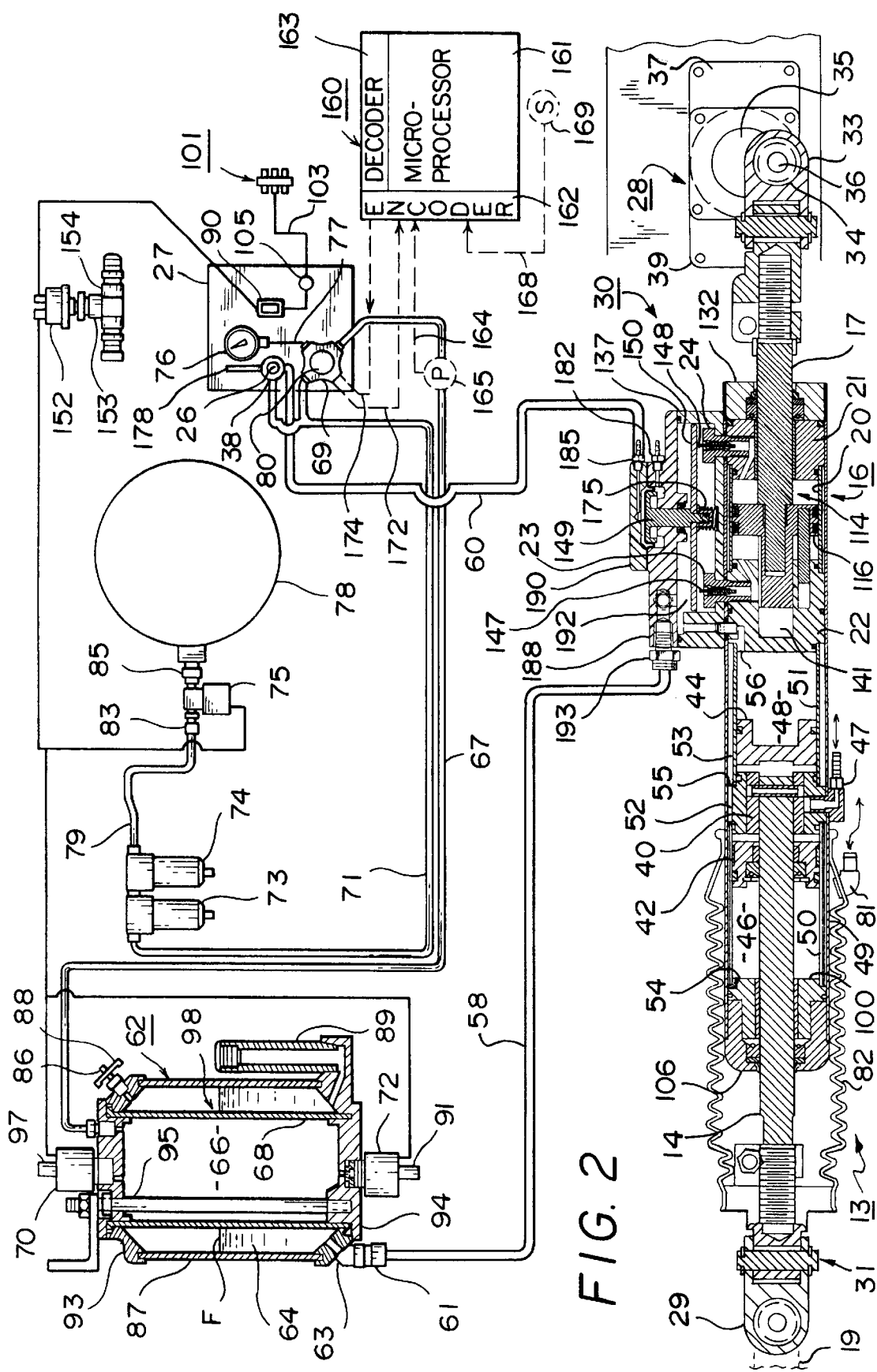
FIG. 2 is a schematic diagram of the fluid and electrical systems and of the major components of the invention, and includes sectional views showing structural details of the accumulator, the steering cylinder assembly and the trim cylinder assembly.

The power centering system of the present invention comprises a power centering compensator, generally designated 10, which may be connected between a frame member or front axle 11 and the tie rod 19 of a conventional motor vehicle as shown in FIG. 1 of the drawings. The steering system components shown are conventional and include bell cranks 32–32 carried by knuckles 34–34 which support steerable wheels 36–36 for pivotable turning movement about kingpins (not shown) mounted on the vehicle frame. Steering inputs by the driver are transmitted to the tie rod 19 by the pitman arm (not shown) of the steering gear. The distal end of a centering rod 14 of compensator 10 is connected to the tie rod 19 by means of a ball joint 29, which may be connected to this rod end by a universal connection 31 therebetween (FIG. 2).

Figure 3:
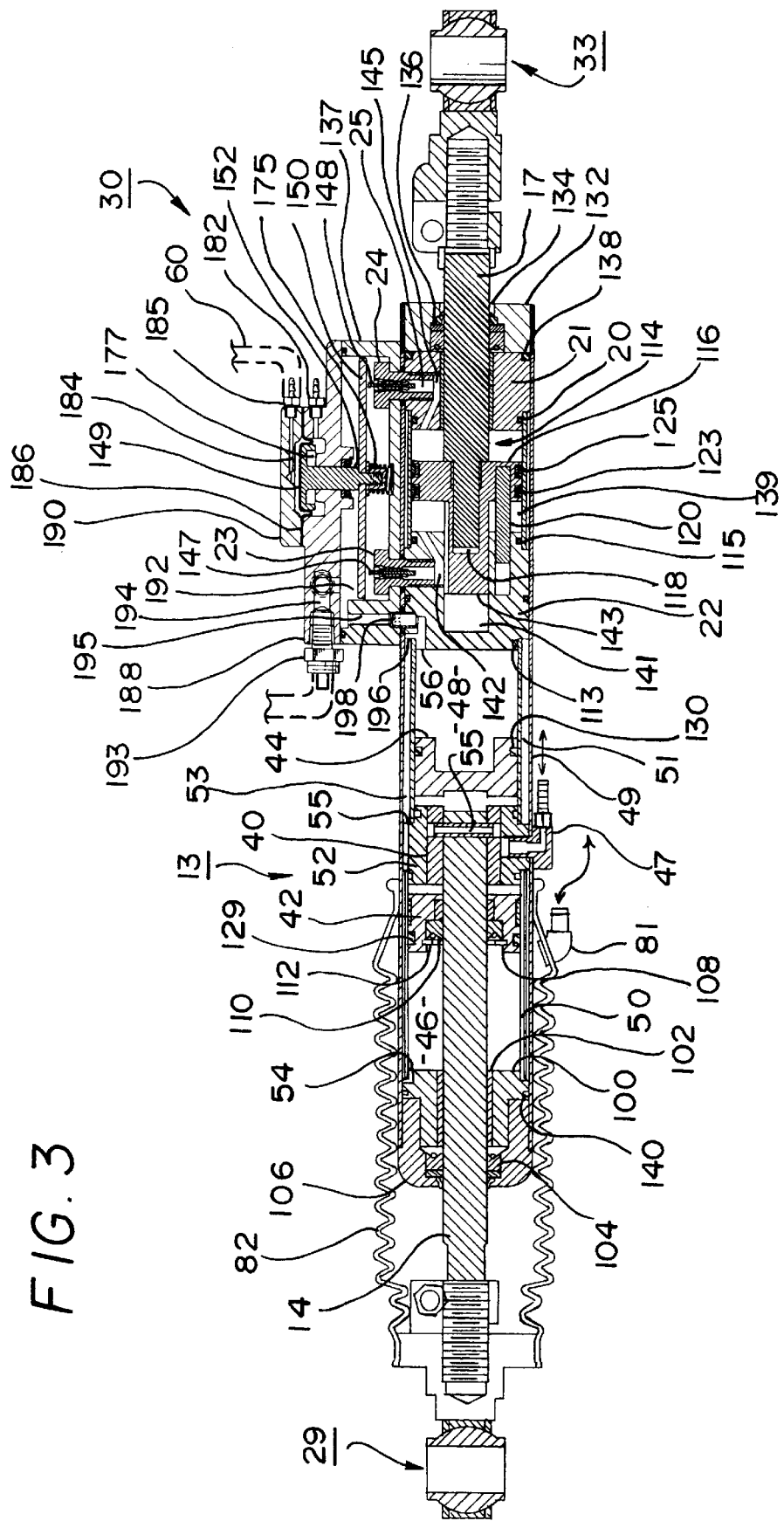
FIG. 3 is an enlarged sectional view of the centering and trim cylinder assemblies of FIG. 2.

As may be seen best in FIGS. 2 and 3, the power centering compensator includes a centering unit 13 having the centering rod 14 extending outward from one end and a trimming unit 16 mounted at the other end. The trimming unit 16 includes a trim cylinder 20 having an outer end head 21 and an intermediate head 22 serving both the trim unit and the centering unit. A trim actuator assembly 30 has a body 137 secured to heads 21 and 22 by bolts 23 and 24, respectively, each having an axial fluid bore 25 communicating with passages 142 and 145 in heads 22 and 21, respectively. A pair of trim valves 147 and 148 are actuated by an air piston 149 acting through a push plate 150 in response to a driver of the vehicle pushing a trim button 26 on a control panel 27, which is preferably located at or near the driver's station of the vehicle. The trim valves 147 and 148 are preferably of the Schrader type.

Preferably, trim button 26 mechanically actuates an air valve 38 of a toggle design that is spring-biased to a normally closed position. However, the same type of valve may be actuated by a solenoid, in which case the trim button is an electrical switch that is spring biased open and the air valve may be located remotely from the control panel. The valve 38 is opened only momentarily when the button 26 is held in a depressed position against the spring bias. Thus, the trim adjusting piston 149 s actuated only while the button is depressed. Release of the button closes the air line and stops the trim adjustment at the point selected.

The trim valve and other components mounted on the driver control panel 27 make it possible for the corresponding steering corrections to be made while driving the vehicle. Should the driver sense a degree of steering wheel pull that becomes a bother, it is then quickly eliminated by pressing the trim button.

The trimming unit 16 also includes a trim rod 17 connected to the axle 11 by means of a mounting bracket 28 which carries the ball element of a ball joint 33 connected to the outer end of trim rod 17 by a universal connection 35 threaded thereon. The ball joints 29 and 33 permit pivotal movement in the vertical plane and to a limited extent in the horizontal plane, and are conventional joints wherein an enlarged spherical member 34 secured to a rod or stub 36 is held for pivotable movement within a surrounding journal structure carried by an arm-like member. The stub 36 of ball joint 33 is mounted off-center on a circular plate 35 of bracket 28 and plate 35 is clamped by bolts between the opposing faces of two additional plates 37 and 39 such that rotation of plate 35 when the bolts are loose provides an overall adjustment of the nominal center distance between mounting bracket 28 and the tie rod connection at ball joint 29.

The components of the centering system and the way in which they center and stabilize a vehicle steering system will now be described. It is to be understood that each of the components described are connected together by appropriately sized fluid conduits and electrical wires and that these conduits and wires are represented by the lines interconnecting the components as shown in FIG. 2.

Referring to FIGS. 2 and 3, there is shown a specific structural arrangement of the components preferably incorporated in or attached directly to the centering unit 13. A centering cylinder housing 49 encloses two separate interior cylinders 50 and 51, the adjacent ends of which are connected together by a center collar 52. The cylinders 50 and 51 contain centering pistons 42 and 44, respectively. An enlarged rod head 40 is fastened to the inner end of centering rod 14 by a transverse pin 55. Head 40 is positioned between opposing faces of pistons 42 and 44 and serves as the actuator for these pistons.

A breather port 47 communicates with the interior of collar 52 to allow air to enter and leave the space between pistons 42 and 44 as they reciprocate in cylinders 50 and 51. Port 47 preferably vents to a vent reservoir (not shown) having an air filter and a liquid drain line containing a stop valve. The distal end portion of centering rod 14 projecting beyond cylinder housing 49 is surrounded by a dirt and grease barrier in the form of a flexible bellows 82, which also may be vented to the vent reservoir via a port 81. As illustrated by double ended arrows in FIG. 2, air flows back and forth in breather ports 47 and 81.

The end of cylinder 50 opposite to collar 52 is closed by a head 100 having a journaled and sealed aperture 102 for sliding passage of centering rod 14. A set of multiple seals 104 and the head 100 are secured in place by an end cap 106 threaded or crimped into the cylinder housing 49. Piston 42 has a sealed aperture 108 for sliding passage of rod 14 during its movement of piston 44. A piston rod seal and journal assembly 110 is secured in piston 42 by a snap ring 112. The end of cylinder 51 opposite to collar 52 is closed by the intermediate head 22 of trim cylinder 20 and the opposing ends of these two cylinders are secured to head 22 by crimping at positions beyond seal rings 113 and 115, respectively. Both pistons 42 and 44 are arranged for compressive movement toward the opposite ends of their respective chambers, piston 42 traveling in chamber 46 and piston 44 traveling in chamber 48 within cylinders 50 and 51, respectively.

The retracted position of each piston is defined by the internal annular collar 52 which serves as a piston stop and preferably has an axial width substantially (preferably within one-ten thousandth of an inch) equal to the axial thickness of rod head 40. A stop width greater than the head thickness is undesirable because gaps between opposing surfaces would allow unbiased movement (slack) between rod 14 and cylinders 50 and 51. A stop width less than the head thickness is also undesirable because this would let fluid flow back and forth between chambers 46 and 48 through a connecting annular conduit 53 formed by an annular space between cylinders 50 and 51 on the one hand and cylindrical housing 49 on the other, the segment of this conduit around cylinder 50 being connected to the segment around cylinder 51 by a passage 55 through collar 52. Such fluid flow would cause the pistons 42 and 44 to move (drift) in the same direction until one of them bottoms out against the collar 52, there being no pressure differential applied to the rod head during such joint piston movement. Accordingly, the fluid pressurization system described below constantly biases the centering pistons 42 and 44 into substantially simultaneous engagement with both the centering stop and the piston rod head at all times when the compensator is activated and in its center position so that there is no significant slack or drift at any time during its operation.

Near the end of each centering chamber opposite to the retracted piston position is a single port for communicating fluid pressure to the chamber, port 54 serving chamber 46 and port 56 serving chamber 48. Ports 54 and 56 are connected together by the annular conduit 53, which in turn is connected via the trim valve assembly 30 and hydraulic conduit 58 to an accumulator 62, which provides hydraulic fluid under pressure to the centering chambers 46 and 48.

The vehicle steering system is properly centered when pistons 42 and 44 abut collar 52. In order to move or break away from collar 52, these pistons must overcome the resistance provided by accumulator pressure acting through the supply line 58, which preferably contains an in-line filter 61. An important feature of the centering unit is the difference in diameters between cylinders 50 and 51, the diameter of cylinder 50 being larger by an amount sufficient to produce equal centering forces on pistons 42 and 44 in spite of the area of piston 42 lost because the centering rod 14 passes therethrough. Thus, to provide equal working areas, the cross-sectional area of cylinder 50 and the annular surface area of piston 42 are greater than the corresponding areas of cylinder 51 and piston 44 by the amount of piston area lost by reason of the aperture through journal assembly 110 in piston 42.

The accumulator 62 has an annular liquid chamber 64, a central gas chamber 66 separated from the liquid chamber by a flexible bladder 68, and solenoid operated upper and lower gas dump valves 70 and 72. A liquid trimming fluid is preferred because it is substantially incompressible as compared to a gaseous trimming fluid and therefore provides the capability of locking the trim piston in its trimmed position without appreciable slack.

Bladder 68 is preferably made of neoprene. Accumulator 62 also includes an upper head 93 and a lower head 94 spaced apart by an outer housing wall 87 and secured together by peripherally spaced bolts 95, only one of which is shown in FIG. 2. Gas chamber 66 is connected to a compressed gas source 78 via a conduit 67, a pressure regulator 69, a conduit 71, a dryer 73, a particle filter 74, a conduit 79, a check valve 83, a solenoid operated cut-off valve 75, and a restrictor orifice 85 for limiting the flow rate to regulator 69.

The gas pressure in chamber 66 is indicated by a pressure gauge 76 which is connected to pressure regulator 69 by a conduit 77. The gas is preferably air, and both the bladder 68 and the surrounding housing wall 87 of accumulator 62 are preferably cylindrical. The gas pressure source 78 may be a pressurized air source, such as an onboard compressor, a vehicle airbrake system or some other conventional air pressure source, and gas pressure is regulated by a control knob 80 on the driver control panel 27.

Preferably centering cylinders 50 and 51, trim cylinder 20, trim valve 30 and accumulator 62 are positioned relative to each other, and return conduit 58 is arranged, such that any gas bubbles in the cylinders and trim valve flow through conduit 58 and into the accumulator via an inlet and outlet port 63. Upon entering accumulator 62, the gas bubbles B rise to the liquid and gas interface F such that the gas accumulates in an upper portion of liquid chamber 64 where it provides an air cushion 98, which may serve the same purpose as the pressurized gas in chamber 66.

Gas chamber 66 should be large enough for liquid chamber 64 to receive the entire volume of fluid from either chamber 46 or 48 without unduly collapsing bladder 68. A bleed passage 86 containing a normally closed vent cock 88 allows liquid chamber 64 to be partially filled with hydraulic fluid up to the level of the top of a filler neck 89.

Gas pressure in chamber 66 acts through bladder 68 to store fluid energy received from the hydraulic side of the system, and to maintain fluid pressure on the liquid side of the respective pistons 42 and 44 until such time as the gas pressure is released to ambient atmosphere by actuation of dump valves 70 and/or 72 in response to turning off the system with an on-off switch 90. Switch 90 is connected to an electrical buss 101 by a line 103 containing a circuit breaker 105. The lower dump valve 72 includes a drain line 91 and has the dual purpose of discharging both gas and any liquid (such as condensed water) accumulating in gas chamber 66. A pressure relief valve (not shown) may communicate with the gas chamber side of the accumulator to provide an upper limit to the resistance and return forces that may be generated by contact between the respective pistons and the piston rod head therebetween.

The air pressure in the accumulator 62 is automatically recharged each time the system is turned on, thereby eliminating a recharge maintenance function. The gas chamber 66 of pressure accumulator 62 is protected from moisture by suitable air filters and/or dryers 73 and 74. On systems supplied by an air compressor, the discharge from the upper accumulator dump valve 70 may be routed to the compressor inlet filter (not shown) for providing a backflush function to keep this compressor filter clean.

As it is best to deactivate compensator 10 in the event of a failure of the power steering system, a switch 152 for interrupting electrical power to solenoid valves 70, 72 and 75 may be provided for vehicles with power steering systems. Switch 152 is mounted on a pressure sensor 153 located in a hydraulic line 154 in fluid communication with the outlet of the power steering pump (not shown). A loss of pressure at the pump outlet causes switch 152 to open, thereby causing gas supply valve 75 to close and dump valves 70 and 72 to open for depressurizing gas chamber 66, which in turn depressurizes liquid chamber 64 and centering chambers 46 and 48 connected thereto. Vent lines 91 and 97 are each preferably of larger capacity than gas orifice 85 to ensure that gas chamber 66 will be depressurized even if gas supply valve 75 fails to close and either dump valve 70 or 72 fails to open with the opening of pressure switch 152.

Accumulator 62 allows hydraulic pressure in the centering chambers 46 and 48 to be precisely varied over a relatively wide range because the gas trapped in gas chamber 66 provides a spring-like return force and this chamber may be sized such that the return force does not vary significantly with compressive piston movement. The gas pressure control may comprise a manual throttle valve (not shown) between conduits 71 and 67, in combination with the pressure gauge 76 to indicate accumulator pressure.

Alternately, the pressure regulator 69 may be used for maintaining a manually selected system pressure. The control knob 80 is provided to permit varying the pressure settings of the regulator by hand. By varying the gas pressure in gas chamber 66 through adjusting pressure regulator 69, the break away resistance and the centering return force produced by the compensator of the invention can be increased or decreased as desired. The range of pressures available should be selected so that break away resistance can be varied from relatively low at low speeds to relatively high at high speeds.

For lighter vehicles, such as automobiles and pickup trucks, the accumulator pressure and other compensator parameters may be chosen so that a linear break away steering force of at least about 30 pounds, preferably at least about 50 pounds, more preferably at least about 100 pounds, and most preferably at least about 150 pounds, must be applied to the tie rod by the pitman arm in order to initiate a break away turning movement of the steerable wheels. For heavier vehicles, such as eighteen wheel trucks and motor homes, these parameters may be chosen to require a linear break away steering force of at least about 200 pounds, preferably at least about 300 pounds, and more preferably at least about 350 pounds. These turning forces are opposed by equal turning resistances which should be maintained for at least small turning angles away from center, preferably 0°–5°, more preferably 0°–3°, and most preferably within one degree on either side of center. After linear movement of the rod head 40 is initiated upon breakaway, the steering force required to sustain movement is a function of the pressure in the accumulator, as well as of other centering phenomena acting on the steering system, such as positive wheel caster. Also after break away, accumulator pressure acting on the off-center piston provides a return force that is effective over the entire range of turning angles, which for highway vehicles is usually limited to about 45° on either side of the center wheel position (the 0° position).

As an alternative to manual adjustment, the output pressure of regulator 69 may be adjusted by a reversible electric motor (not shown) controlled by an on-board computer 160, which comprises a microprocessor 161, an encoder 162 and a decoder 163. Encoder 162 converts to digital signals an analog signal 164 input from a pressure sensor 165 in the gas supply conduit 67, an analog signal 168 input from a vehicle speed sensor 169, and an analog signal 172 input from a position sensor (not shown) within regulator 69. Decoder 163 converts digital control signals generated by microprocessor 161 to an analog signal 174 for controlling the reversible electric motor which adjusts the output pressure provided by regulator 69. The gas pressure in gas chamber 66 and the resulting resistance and centering forces are thereby made automatically responsive to the speed of the vehicle to provide "speed sensitive centering" of the vehicle's steering system. It is preferable that the resistance to turning movements away from the center position be increased automatically as the speed of the vehicle increases because the effects of small off-center movements in response to spurious steering inputs increase dramatically with vehicle speed.

Intermediate head 22 engages trim cylinder 20 beyond the end of centering cylinder 51 and trim cylinder 20 defines a trimming chamber 114 containing a trim piston 116 adjustable threaded to the inner end of the trimming rod 17. Trim piston 116 divides chamber 114 into an extending chamber 139 and a retracting chamber 146. An intermediate gap 118 is provided for axial adjustment of trim piston 116 relative to the inner end of trimming rod 17. After an adjustment, rotation of trim piston 116 relative to trimming rod 17 is prevented by one or more guide pins 120 slidable in a corresponding slideway 122, which may be arranged in either or both of the trim cylinder heads 21 and 22.

For sealingly engaging trim cylinder 20, trim piston 116 carries two sets 123 and 125 of dual circumferential seals, each set comprising an outer seal of square cross section concentrically stacked on a more resilient seal of oval cross section to provide a close tolerance seal arrangement for substantially preventing any leakage past the trim piston. This precludes any significant drift of trim piston 116 away from its locked position for setting the on-center position of centering rod head 40. Similar sets 129 and 130 of close tolerance, dual circumferential seals are also preferably provided on centering pistons 42 and 44, respectively.

Chamber 114 is closed at its inner end by the head 22 and at its outer end by the end head 21, which is secured in place by an end cap 132 which is similar to end cap 106 at the outer end of cylinder 50. The trimming rod 17 passes through journaled and sealed aperture 134 in end head 21 and end cap 132. A set 136 of multiple seals is secured in place by the end cap 132, which may be threaded into cylinder housing 49 at its end opposite to that receiving end cap 106. An O-ring seal 138 is provided between end cap 132 and head 21, and an O-ring seal 140 is provided between end cap 106 and its corresponding end head 100. Additional circumferential seals of either circular or rectangular cross section are provided on the heads 21, 22 and 100 as indicated by the small circles without cross-sectional lines in the cross-sectional view of these heads in FIG. 3.

Figure 4:
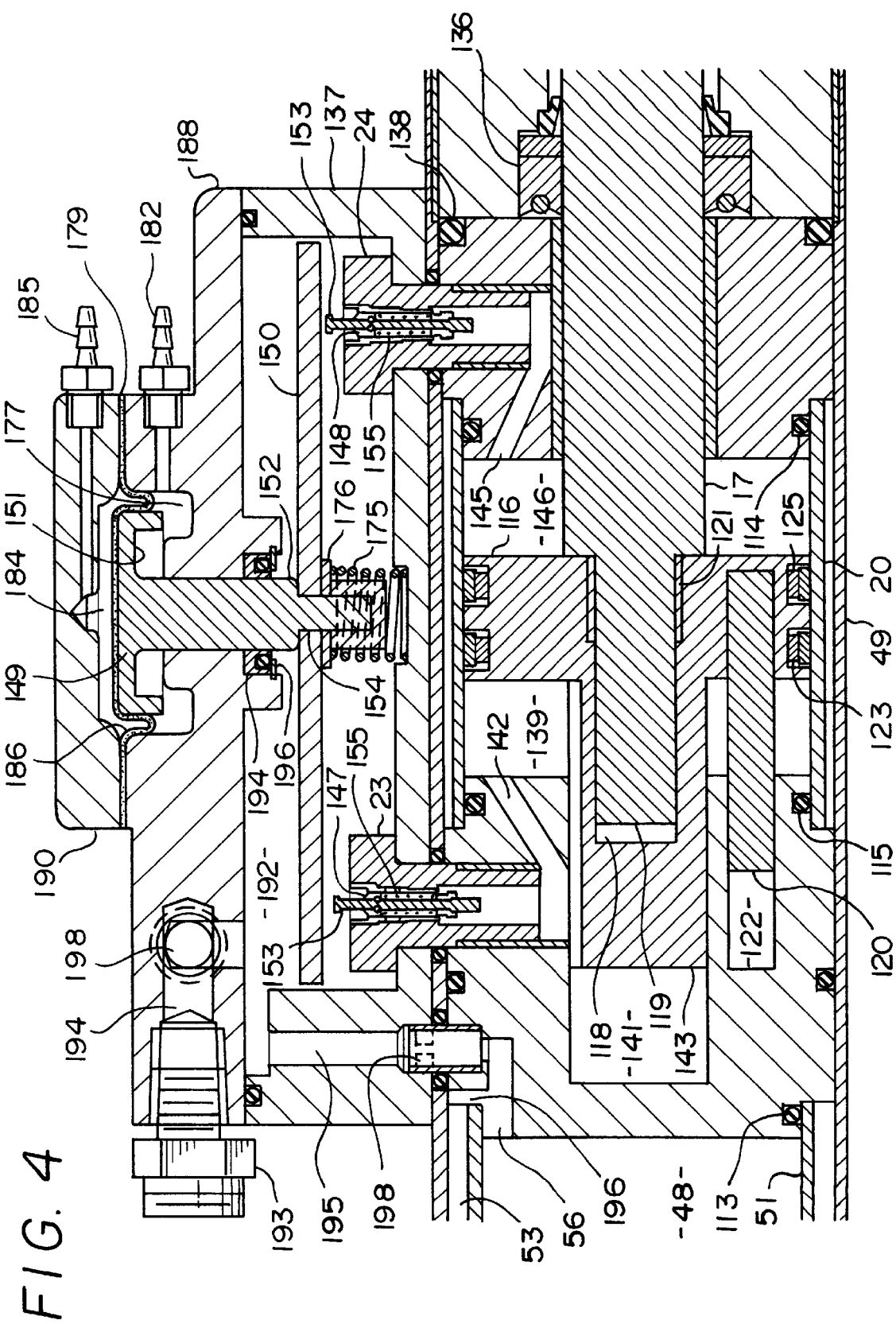
FIG. 4 is an enlarged fragmentary sectional view of the trim cylinder assembly of FIG. 3 showing the dual trim valves in their closed positions.

A slanted portion of port 142 in the head 22 of trim unit 16 provides a combined inlet and outlet into the extending trim chamber 139 on one side of trim piston 116 and also into a bore 141 for receiving an axial extension 143 of trim piston 116. A slanted portion of port 145 in head 21 of trim unit 16 provides a combined inlet and outlet into the retracting trim chamber 146 on the other side of trim piston 116. The chambers 139 and 146 are thus arranged to contain hydraulic fluid to prevent retraction and extension, respectively, of trimming rod 17 when the trim valves 147 and 148 are closed as shown in FIGS. 3 and 4. When valves 147 and 148 are open as shown in FIGS. 5 and 6, fluid communication between ports 142 and 145 and a fluid transfer chamber 192 in trim valve body 137 is provided by the corresponding axial passage 25 in each of the respective securing bolts 23 and 24.

The fluid flow passages and components in the housing 137 of the trim valve assembly 30 will now be described with reference to FIGS. 3 to 6. Fluid may be supplied to or discharged from trim chambers 139 and 146 only when vales 147 and 148 of the trim valve assembly 30 are opened by the push plate 150, such fluid being supplied to one trim chamber only while being discharged simultaneously from the other trim chamber. In order to operate the valves 147 and 148, push plate 150 reciprocates in the fluid transfer chamber 192 between a retracted position as shown in FIG. 4 and an extended position as shown in FIG. 5.

Fluid available from conduit 58 is supplied to valves 147 and 148 in the ported bolts 23 and 24 via the transfer chamber 192, which is connected to the conduit 58 by a housing passage 194 and a nipple 193 of a housing cover member 188 secured to the housing body 137 by a series of bolts (not shown).

Figure 5:
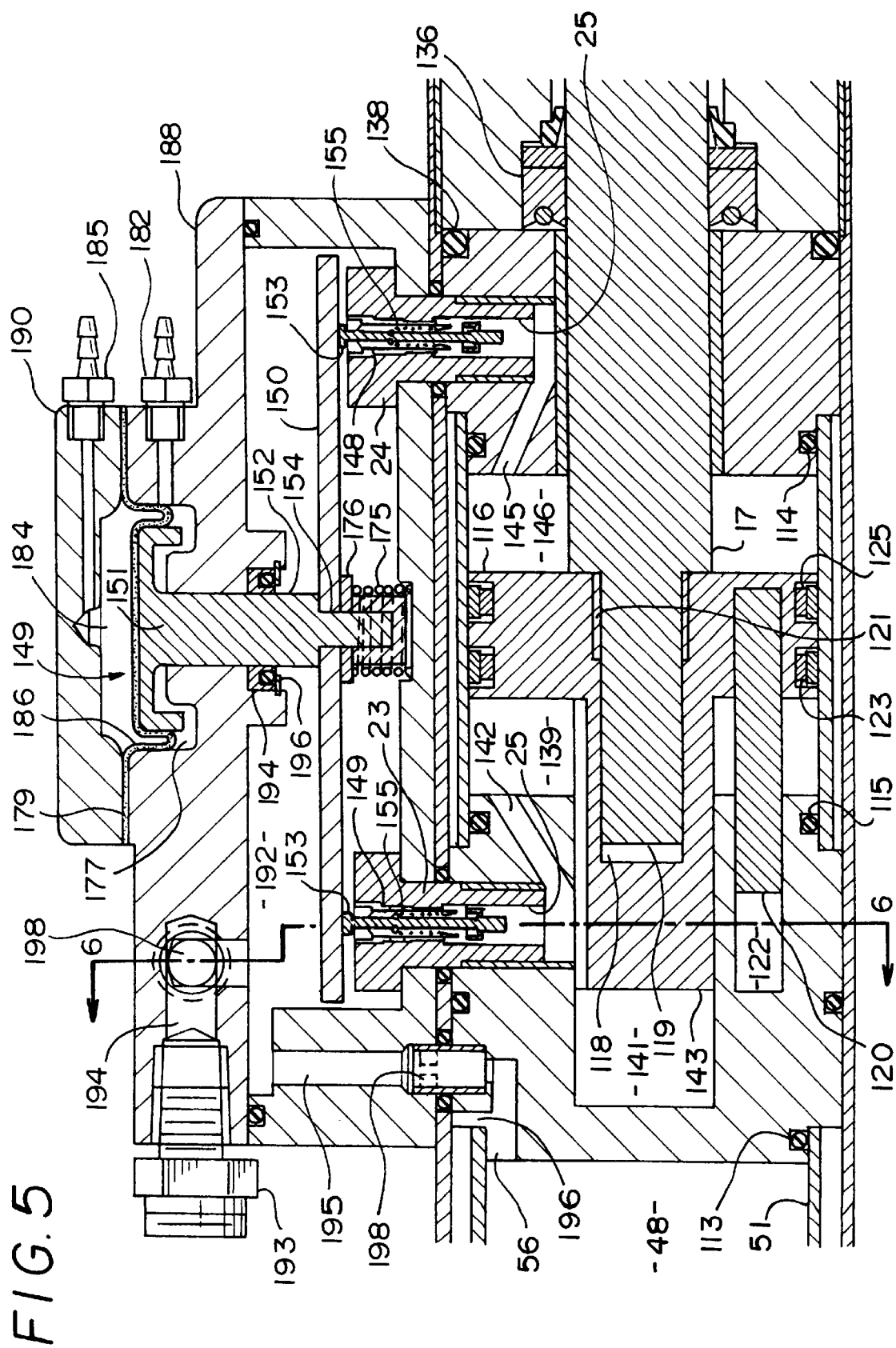
FIG. 5 is an enlarged fragmentary sectional view of the trim cylinder assembly of FIG. 3 showing the dual trim valves in their open positions.

Referring to FIGS. 4 and 5, the Schrader valves 147 and 148 are opened when their stems 153,153 are pressed downward against the tension of their springs 155,155 by the push plate 150 in response to actuation of air piston 149, which is mounted in cover member 188 for reciprocal movement within an air chamber 184 formed by opposing cavities in cover member 188 and an air header 190. The piston 149 includes a head 151 and a rod 152 having a smaller diameter stub 154 passing through an aperture in push plate 150 and secured therebelow to a spring guide 176 for holding in position a compression spring 175, which is arranged to return push plate 150 to its retracted valve closing position upon depressurization of the air chamber 184. To provide such depressurization, the air valve 38 as actuated by the trim button 26 vents chamber 184 to the atmosphere via a vent line 178 when the trim button 26 is released.

Air from a breathing chamber 177 below the piston head 151 flows back and forth through a vent nipple 182 as the piston 149 reciprocates in chamber 184. The chamber 177 is sealed from chamber 184 by a flexible diaphragm 186. Diaphragm 186 is preferably made of neoprene, and is preferably attached to the upper face of piston head 151 by an adhesive composition. An outer peripheral edge 179 of diaphragm 186 is firmly clamped between the air header 190 and the cover member 188, and these two members are firmly secured together by a series of bolts (not shown). The chamber 177 is sealed from the hydraulic fluid in transfer chamber 192 by a seal ring 194 held in position in cover member 188 by a snap ring 196.

As previously described, when push plate 150 is in its upper, retracted position as shown in FIG. 4, the Schrader valves 147 and 148 are closed to prevent any fluid flow between trim chambers 139 and 146 on the one hand and fluid transfer chamber 192 on the other hand. When trim button 26 on the control panel 27 is pushed to actuate its air valve, pressurized air is fed from line 71 through line 60 and nipple 185 into air chamber 184. This pressurization of air chamber 184 depresses piston 149 and thereby actuates push plate 150 to its extended position for opening Schrader valves 147 and 148 as illustrated in FIG. 5. The opening of these valves allows fluid to flow from one trim chamber to the other trim chamber via passages 142, 145 and 25 and transfer chamber 192, thereby allowing trimming movement of trim piston 116. When the trim button 26 is released, depressurization of the air chamber 184 allows the piston 149 and the push plate 150 to be returned to their retracted positions by the compressed spring 175, thereby reclosing the Schrader valves 147 and 148 and locking the trim piston 116 in its new position.

Fluid from supply conduit 58 is supplied to the port 56 of centering chamber 48 via the passage 194, the transfer chamber 192 and a passage 195 in housing body 137. The supply pathway for fluid supplied to port 54 of centering chamber 46 is the same as that for centering chamber 48, except fluid flows through a port 196 provided around an end portion of cylinder 51 adjacent to port 56, and then through the annular conduit 53. Fluid discharged from centering chamber 46 is returned to the passage 195 via the port 54, annular conduit 53 and port 196; and fluid discharged from centering chamber 48 is returned to passage 195 via the port 56. From passage 195, the returned fluid flows to accumulator reservoir 64 via transfer chamber 192, passage 194, nipple 193 and conduit 58.

The air chamber 66 of accumulator 62 may be pressurized by air to a pressure of, for example, 100 psi to provide the same pressure in each of the centering chambers 46 and 48. If the working area of each of the pistons 42 and 44 is 3.5 square inches, an accumulator pressure of 100 psi will provide a linear resistance force of 350 pounds as measured at the tie rod 19 for opposing off-center movement of rod head 40. Since many conventional steering system geometries provide a linear resistance force of about 15 to 20 pounds as measured at the tie rod, the present invention may be used to increase the resistance and re-centering forces of these steering systems by a multiple of about 5 to about 30 or more, preferably about 10 to about 25. A resistance force of 300 pounds or more is particularly effective in eliminating the adverse effects of crosswinds on large vehicles.

As an option, passage 195 may contain a flow restriction orifice 198 to limit the rate of fluid flow into and out of centering chambers 46 and 48. Alternatively, passage 195 may be sized to provide this flow restriction. For a power centering compensator having the foregoing characteristics, the flow restriction orifice 198 may be sized at a diameter of about one eighth inch. This passage size should not significantly affect off-center and return to center movements of the rod head 40 during normal steering and turning maneuvers in response to movements of the vehicle steering wheel. However, excessively rapid movement of the tie rod, such as may be caused by blowout of a steerable wheel tire, is viscously dampened by the flow resistance of orifice 198 so that the course of the vehicle may be safely controlled with relatively little additional steering effort by the driver. To illustrate this viscous dampening effect, it has been determined that initiation of an excessively rapid tie rod movement, as might be experienced during a tire blowout, can increase the pressure in the centering chambers from 100 psi to 200 psi, the latter applying a linear force of about 700 pounds to the tie rod.

The remotely controlled trim valve assembly 30 operates as follows. If there is a roadway pull to the right, straight ahead travel will require a compensating steering force to the left from the steering wheel, which will move the centering piston 44 slightly to the right away from stop 52. Such movement of piston 44 in its chamber 48 causes piston 42 acting against stop 52 to produce a differential pressure across trim piston 116 in trim cylinder 20. While holding the steering wheel in the position giving straight ahead travel, the trim button 26 is pushed momentarily to briefly open air valve 38, which allows fluid to be discharged from trim chamber 139 and supplied to trim chamber 146, such that cylinder housing 49 moves to the right and the differential pressure across trim piston 116 is removed by equalizing the pressures in trim chambers 139 and 146.

The movement of trim piston 116 in trim cylinder 20 causes centering piston 44 to be reseated in its rest position against stop 52, centering piston 42 remaining in its seated position against stop 52 during this trimming operation. After its momentary actuation, the trim button 26 is then released to close air trim valve 38 and thereby lock trim piston 116 in its changed position corresponding to a new on-center position in which stop 52 is realigned with rod head 40. This new on-center position of stop 52 will then maintain the vehicle steering system in a newly centered condition, which provides straight ahead travel of the vehicle that is free from the previously experienced roadway pull to the right and will be maintained even when the steering wheel is released.

The trim piston in the trim cylinder preferably has a stroke of less than one inch, more preferably about one-half inch, and the hydraulic fluid in this short trim cylinder is trapped on opposite sides of the trim piston by the valves 147 and 148, creating a hydraulic lock that holds the centering stop of the centering cylinder in a selected on-center position. The average trim corrections may be on the order of a few one-thousandths of an inch. Therefore, the tolerance for backlash (rebound) or drift in either direction of the trim piston in the trim cylinder is preferably held to one-thousandth of an inch or less.

As an alternative to the foregoing embodiment wherein fluid for the centering cylinders passes back and forth through supply conduit 58 without restriction, the conduit 58 may be replaced by an alternate centering fluid system 240 providing additional power centering features. Thus, an additional level of resistance to be overcome before turning movement may be initiated is provided by a pressure differential valve 242 in a return conduit 244, which also contains an orifice 254. Although accumulator pressure alone will resist off-center movement of the centering pistons in the absence of a pressure differential valve, this valve may be used so that the steering force required to initiate a turning movement away from center is substantially higher than the return force for returning the system to center upon removal of the steering force. Until pressure in one of the centering chambers exceeds the setting of valve 242, movement of both pistons is prevented by fluid trapped in the centering chambers by this valve and check valve 248 in a supply conduit 250. A solenoid operated dump valve 246, which may be actuated by switch 152, will release any residual centering chamber pressure through a drain line 247 in the event of a failure in the power steering system.

When the pressure setting of differential pressure valve 242 is reached, fluid then flows through conduit 244 and a conduit 252 into accumulator liquid chamber 64. Valve 242 is preferably of the spring biased type and broken line 258 represents a pilot line through which centering chamber pressure is applied until it overcomes the force of a diaphragm spring 260 and opens the valve. The pressure setting of this valve can be varied by adjusting the spring tension, and the valve may include a remotely controlled solenoid 262 so that the pressure differential can be controllably varied, either automatically or by a manual selector, in accordance with vehicle speed.

The orifice 254 may be used to control the rate of fluid flow out of the respective centering chambers when valve 242 is open. Orifice 254 may be fixed or variable in size and in either case provides a flow resistance that varies in response to the rate of piston movement. If orifice 254 is of variable size, it may be operated by a remotely controlled solenoid 256 to make its flow restriction controllably variable in response to vehicle speed or to a manual selector. Orifice 254 may comprise a solenoid operated throttle valve or a multiported valve with different size outlet orifices. Both the orifice solenoid 256 and the valve solenoid 262 may be controlled automatically by the on-board computer 160 through the use of inputs and outputs similar to those already described for automatically controlling pressure regulator 69.

The pressurized hydraulic fluid available from the accumulator 62 is transmitted to the centering chambers 46 and 48 through the inlet/outlet conduit 252 and supply conduit 250. This accumulator energy provides the return force for reseating pistons 42 and 44 in their retracted positions upon removal of intentional steering inputs. Should the rate of piston return to center be too rapid and cause the steering system to overshoot its center position, an orifice 264 may also be installed in supply conduit 250 to control the rate of fluid flow into the respective centering chambers. However, such flow restrictions should not prevent a relatively free and rapid return of all components to center.

Although alternative fluid system 240 is optional, the differential pressure valve 242 is an important feature because it may provide improved centering stability and steering control. The steering force may vary within the range of resistance represented by valve 242 without generating any steering movement. This valve then opens at its set point and remains open as long as a pressure differential exists between pilot line 258 and conduit 252. It will therefore remain open while a centering piston is moving away from center and will close only when such movement stops because continuing flow through orifice 254 will then equalize the pressure differential and cause valve 242 to close.

Thereafter, when the steering force drops below the opposing return force[] generated by accumulator pressure through supply conduit 250, the off-center piston returns to its retracted position as fluid flows from the accumulator through check valve 248. Differential pressure valve 242 in combination with accumulator 62 therefore provides a static resistance force greater than the dynamic resistance force provided by the accumulator alone. The term "static" is used in this specification to distinguish the variable resistance force provided by orifice 254 in response to the rate of fluid flow produced by movement of a centering piston. By comparison, the static resistances provided by accumulator 62 and valve 242 are both present without fluid flow.

The important trimming feature of the invention may be achieved through drive means other than the air actuated hydraulic trimming unit 16. For example, movement of trim rod 17 may be accomplished by controllably varying its position with solenoid actuated hydraulic valves or a reversible electric motor pivotally mounted on the vehicle axle 11 in place of trimming unit 16. Such trimming arrangements are described in the my prior U.S. Pat. Nos. 4,418,931; 4,534,577; and 5,536,028; the entire contents of which are incorporated herein by reference. However, the air actuated piston and trimming cylinder arrangement shown in the drawings is preferably for its precision, simplicity and ease of installation on a wide variety of vehicles.

A number of modifications and alterations are possible without departing from the scope of the present invention. For example, internal passageways within the trim housing body 137, similar to those described in my U.S. Pat. No. 5,536,028 may be provided so that the trim valve means comprises a single trim valve actuated directly by the piston rod stub 154 and this valve alone controls fluid flow between the trim chambers 139 and 146 and between each of these chambers and the transfer chamber 192. Another contemplated modification is that the return spring 175 and related components may be eliminated from the air piston return means by adding a second set of air supply and vent ports to air valve 38 and an air pressure line to nipple 182 so that pressurized air may be introduced into chamber 177 beneath piston head 151 for causing retraction of piston rod 152 upon depressurization of air chamber 184. In addition, the fluid used for actuating piston 149 may be a liquid instead of a gas, such as a portion of the pressurized liquid available from the accumulator 62.

The remote trimming features of the invention are useable not only with the centering unit disclosed herein, but also in combination with centering mechanisms of the prior art. Thus, the remotely operable trimming unit of the present invention can be combined with centering devices of known types, such as those disclosed in my prior patents mentioned above, to provide adjustment of the center position during vehicle operation. In addition, a number of other modifications to both the turning resistance components and the trimming components specifically described herein are possible without departing from the scope of the invention, as defined by the claims below.

What is claimed is:

1. An apparatus for positioning at least one steerable member mounted on a frame means for movement to either side of a selected center position, said apparatus comprising:

resistance means for providing a resistance force resisting steering forces tending to move said steerable member to either side of said center position, said resistance means comprising linkage means of variable length extending between said steerable member and said frame means, the length of said linkage means defining said center position;

trim means operable for varying said center position of said steerable member, said trim means comprising a trim piston, trim cylinder means for providing first and second trim chambers one on each side of said trim piston, and trim passage means for providing a flow of a liquid to and from each of said trim chambers, said trim piston being movable relative to said trim cylinder means to cause said flow and vary said center position by changing the length of said linkage means; and, actuator means for operating said trim means so as to controllably vary said center position of said steerable member from a location remote from said trim means and said steerable member, said actuator means comprising:

a source of said liquid, trim conduit means for providing a flow of said liquid between said source and said trim passage means, trim valve means operable between a closed position for preventing said liquid flow from each of said trim chambers and an open position for allowing said trim piston to move relative to said cylinder, said piston movement causing said liquid flow to one of said trim chambers and said liquid flow from the other of said trim chambers, and operating means activatable from said remote location for operating said trim valve means between said closed and open positions, said operating means comprising a piston head arranged for reciprocal movement in an actuator chamber between a rest position and a depressed position, actuator fluid means for pressurizing said actuator chamber to cause movement of said piston head from said rest position to said depressed position and for depressurizing said actuator chamber for return movement of said piston head to said rest position, and push means connected to said piston head for movement between an extended position in which a push element of said push means moves at least one stem of said valve means to cause said valve means to be in its open position and a retracted position in which said push element moves said at least one stem to cause said valve means to be in its closed position, said valve open and closed positions corresponding respectively to the depressed and rest positions of said piston head.

2. An apparatus according to claim 1 wherein said at least one valve stem is biased by a valve spring bias means to cause said valve means to be in its closed position, wherein said push means comprises a piston rod connected to said piston head and to said push element and engaged by piston spring means for biasing said piston head in its rest position, wherein said push element pushes said valve stem against the bias of said valve spring bias means to open said valve means, and wherein said push element releases said valve stem such that the bias of said valve spring bias means causes said valve means to close.

3. An apparatus according to claim 2 wherein said at least one valve stem comprises a first valve stem for controlling fluid flow in a first passage leading to said first trim chamber and a second valve stem for controlling flow in a second passage leading to said second trim chamber; wherein said valve spring bias means comprises a first spring element for biasing said first valve stem to close said first passage and a second spring element for biasing said second valve stem to close said second passage; and wherein said push element comprises a plate connected to said piston rod and arranged to depress said first and second valve stems against said spring biases to cause said first and second valve stems to respectively open said first and second passages.

4. An apparatus according to claim 1 wherein said liquid source includes accumulator means comprising a housing wall and an interior wall cooperating with said housing wall to define an annular reservoir for holding a supply of said liquid, and a port for providing fluid communication between said reservoir and said trim conduit means.

5. An apparatus according to claim 4 wherein the interior wall of said accumulator means comprises a flexible diaphragm defining a gas chamber; and wherein said apparatus further comprises means for pressurizing said gas chamber with a gas to cause said diaphragm to pressurize the liquid in said reservoir, and means for controllably varying the pressure of said gas so as to vary said liquid pressure.

6. An apparatus according to claim 1 wherein said resistance means further comprises:

centering cylinder means for providing a portion of said linkage means;

a first piston cooperating with said centering cylinder means to define a first centering chamber;

a second piston cooperating with said centering cylinder means to define a second centering chamber, each of said first and second pistons being arranged to move independently of the other between a retracted position and a position for compressing a fluid within its corresponding chamber;

centering rod means for providing another portion of said linkage means and comprising a rod head arranged for movement to either side of a neutral position corresponding to said center position, and an elongated rod for causing said rod head to engage each of said pistons independently of the other so that movement of said rod head away from said neutral position to one side causes compressive movement of said first piston without moving said second piston and movement of said rod head away from said neutral position to the other side causes compressive movement of said second piston without moving said first piston;

connecting means for connecting said centering rod means to said steerable member for movement therewith; and, centering conduit means for providing a pressurized fluid in each of said first and second centering chambers so that fluid pressure provides said resistance force by opposing movement of said steerable member toward either side of said center position and provides a return force continuously biasing said steerable member toward said center position during movement of said steerable member to either side of said center position, said fluid being said liquid under a pressure provided by a pressurizing means, and said liquid pressure causing said pistons to bias said rod head toward said neutral position during said compressive movements.

7. An apparatus according to claim 6 wherein said pressurizing means includes means for controllably varying said liquid pressure so as to vary at least one of said resistance force and said return force.

8. An apparatus according to claim 6 wherein liquid from said pressurizing means flows to and from said centering chambers via said centering conduit means, and wherein said centering conduit means comprises a pressure actuated valve means for preventing fluid flow from said centering chambers until the engagement between said rod head and one of said first and second pistons produces a fluid pressure differential of a selected amount above the pressure provided by said pressurizing means.

9. An apparatus according to claim 8 wherein said pressure actuated valve means includes means for controllably varying said selected amount of fluid pressure differential.

10. An apparatus according to claim 6 for use on a vehicle having a steering system comprising said at least one steerable member, wherein said pressurizing means comprises gas pressure means for applying pressure of a pressurized gas to said liquid in a liquid reservoir, and control means for automatically adjusting the amount of said gas pressure in response to the speed of said vehicle.

11. An apparatus according to claim 6 for a vehicle having a power steering unit for providing steering power to said steerable member, said apparatus further comprising means for preventing said liquid pressure in the absence of steering power from said power steering unit.

12. An apparatus according to claim 6 wherein liquid flowing out of said centering chambers is returned to said pressurizing means by said centering conduit means, and wherein said centering conduit means comprises a portion of said trim passage means.

13. An apparatus according to claim 12 wherein said centering cylinder means comprises a first cylinder for carrying said first piston, a second cylinder for carrying said second piston, and a cylindrical housing in spaced relation around said first and second cylinders to form an annular conduit providing a portion of said centering conduit means, one end of said annular conduit being in fluid communication with said first centering chamber and another end of said annular conduit being in fluid communication with said second centering chamber and with said trim passage portion.

14. An apparatus according to claim 6 wherein said centering cylinder means comprises a first cylinder for carrying said first piston, a second cylinder for carrying said second piston, and a cylindrical housing in spaced relation around said first and second cylinders to form an annular conduit providing a portion of said centering conduit means, one end of said annular conduit being in fluid communication with said first centering chamber and another end of said annular conduit being in fluid communication with said second centering chamber.

15. An apparatus according to claim 14 wherein an inner end of said first cylinder and an inner end of said second cylinder are connected together by an annular stop arranged to be abutted by said first and second pistons in their retracted positions, said annular stop having a central bore for receiving said rod head and a passageway for interconnecting a first segment of said annular conduit adjacent to said first centering chamber and a second segment of said annular conduit adjacent to said second centering chamber.

* * * * *